United States Patent [19]

Saeki et al.

[11] Patent Number: 4,459,375
[45] Date of Patent: Jul. 10, 1984

[54] RESIN COATED SAND FOR SHELL FOUNDRY PROCESS

[75] Inventors: Yukio Saeki; Yukio Tokunago, both of Fujieda, Japan

[73] Assignee: Sumitomo Durez Company, Ltd., Tokyo, Japan

[21] Appl. No.: 479,774

[22] Filed: Mar. 28, 1983

[30] Foreign Application Priority Data

May 13, 1982 [JP] Japan .................... 57-79142

[51] Int. Cl.$^3$ .............................. C08K 5/05
[52] U.S. Cl. .................... 523/145; 523/147; 524/326
[58] Field of Search ............ 523/145, 146, 147; 428/404; 524/326

[56] References Cited

U.S. PATENT DOCUMENTS

| | | | |
|---|---|---|---|
| 3,917,558 | 11/1975 | Gardikes et al. | 523/145 |
| 4,252,700 | 2/1981 | Funabiki et al. | 523/145 |
| 4,290,928 | 9/1981 | Funabiki et al. | 523/145 |
| 4,336,179 | 6/1982 | Iyer | 523/145 |
| 4,379,866 | 4/1983 | Henry et al. | 523/145 |

FOREIGN PATENT DOCUMENTS 950291  2/1964  United Kingdom .......... 523/145

*Primary Examiner*—Lewis T. Jacobs
*Attorney, Agent, or Firm*—James F. Tao; James F. Mudd

[57] ABSTRACT

An improved resin coated sand for use in foundry shell-molding applications is disclosed which has increased resistance to thermal shock at the time of pouring. The improved product uses a phenolic resin as binder with aromatic compounds selected from the following generic formulae:

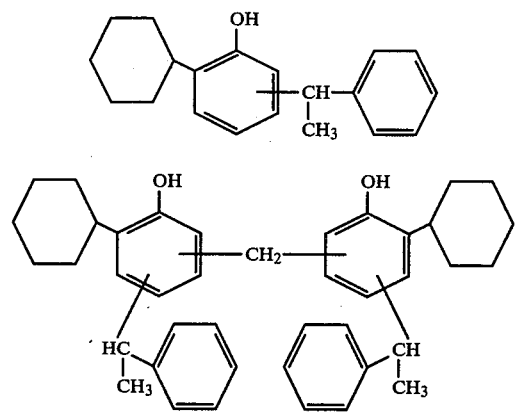

The foundry aggregates are mixed with the phenolic resin and organic compounds under conventional mixing conditions to form a sand-resin mixture that can be formed into shell-molds. Upon casting the molten metal into these molds, the abrupt thermal expansion of the coated sand is controlled to eliminate the cracking that occurs when conventional phenolic-sand mixtures are employed.

12 Claims, 1 Drawing Figure

RESIN COATED SAND FOR SHELL FOUNDRY PROCESS

BACKGROUND OF THE INVENTION

This invention relates to an improved resin coated sand for use in shell-molding foundry operations, to eliminate the problems of thermal shock caused when hot metal is cast into the mold. In conventional sand molding operations, a mixture of sand coated with resin binder is placed in a mold, and the heat of the processing steps causes reactions between the binder components to improve the pressed strength of the sand and retain the configuration of the part to be cast.

Upon introduction of the molten metal into the mold, the temperature difference between the molten metal and the mold is great, and the heat of molten metal is transferred to the mold creating thermal shock in the mold, which may create cracks and fissures in the sand mold. The abrupt expansion caused by the temperature differential, destroys the binding action of conventional phenolic binders and cracks and rupture of the mold occur.

The effect of the heat of the molten metal upon the binder is advantageous, since this heat destroys the binder holding the sand or aggregate, and allows, upon cooling, the easy removal of the sand from the cast molded part. The sand is removed by tapping or flogging the molten part to remove the particles. This is known as the shake out property of the mold.

Therefore a resin mixture must be selected that will provide adequate thermal shock protection as well as allow simple removal of the binder-aggregate from the cast item.

A known method to solve the drawback for preventing the molds from cracks has been adopted by means of incorporating cushioning substances into phenolic resins or coated sand obtained therefrom. This method can make the molds flexible as well as free from stress at heating thereof. Said conventional cushioning substances are Vinsol, bisphenol A, petroleum resins, rosin, etc. While these substances play a role of cushioning effect in the molds to a certain extent, they have drawbacks in that they emit a disagreeable odor at pouring, due to a thermal decomposition of evaporation thereof. Also, the molds containing such materials are poor in the shake-out property.

After much investigation to overcome said drawbacks, the inventors hereof have found that the presence of mono-styrenated o-cyclohexylphenols having the following generic formula in resin coated sand:

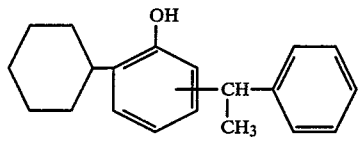

(Mono-styrenated o-cyclohexylphenol)
and/or

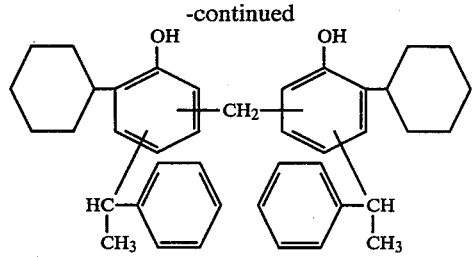

(methylene bis-mono-styrenated o-cyclohexylphenol)

prevents the molds from cracks at pouring, free from disagreeable odor, and do not impair the shake-out property.

SUMMARY OF THE INVENTION

This invention discloses method to improve the resistance to thermal shock of phenolic resins employed as binders in said molding operations. Incorporated into the resin or resin-sand mixture is a compound selected from the following generic formulae:

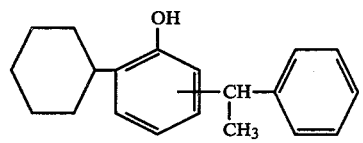

(mono-styrenated o-cyclohexylphenol)

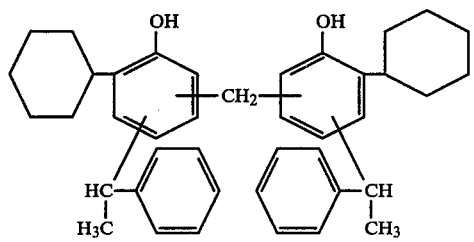

(methylene bis-mono-styrenated o-cyclohexylphenol)

The incorporation of such compounds provide improved shake-out properties for castings using this binder in said-molding operations. The phenolic resin may be of the novolac type, the resole type or a mixture of novolac and resole phenolic resins.

DESCRIPTION OF THE DRAWING

The FIGURE is a side view of the test device used to determine the shake-out property of the cured resin coated sand.

DETAILED DESCRIPTION OF THE INVENTION

Figure 1:
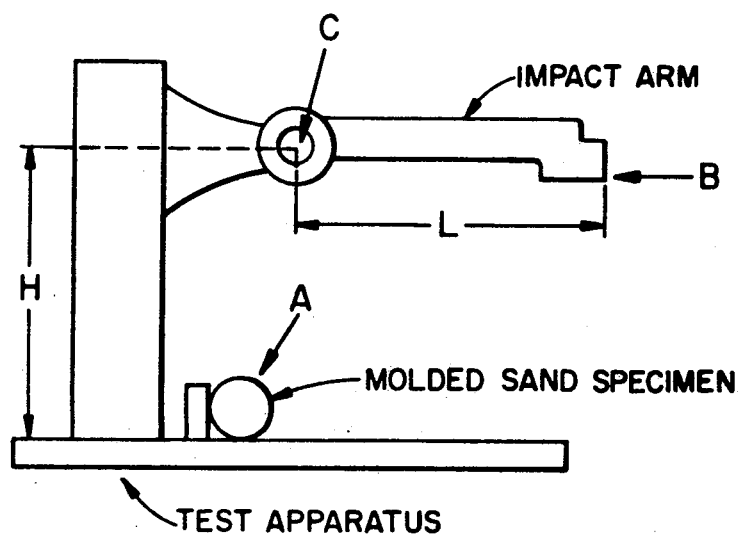

Conventional shell molding operations employ coated foundry sand or aggregated prepared by mixing heated sand with a phenolic resin until an uniform dispersion is obtained. Catalysts and fillers can be added if desired. The phenolic resin can be selected from novolac resins, resole resins or mixtures thereof.

Novolac type phenolic resins are generally prepared by reacting 1 mole of phenols with 0.6 to 0.9 moles of aldehydes in the presence of acidic catalysts, as their molar proportion range. Resole type phenolic resins are generally prepared by reacting 1 mole of phenols with 1 to 3 moles of aldehydes in the presence of basic catalysts, as their molar proportion range.

The phenolic resins used in the present invention are any of the novolac, the resole type or a mixture thereof. Phenols for preparing said phenolic resins are phenol, cresol, xylenol, etc., however, they are usable in the presence of resorcin, cathecol, hydroquinone, aniline urea, melamine, cashew nut shell oil, etc. Formaldehyde for preparing said phenolic resins is selected from formalin, paraformaldehyde, trioxane, etc. Catalysts for the reaction of phenol and formaldehyde are one or more of acidic substances generally such as oxalic, hydrochloric and sulfuric acid, and organic metal salts for novolac type resin prepartion. Basic substances used as catalysts for resole type resin preparation are generally selected from primary amines such as ammonia and ethyl amine; secondary amines such as ethylene diamine and diethyldiamine; tertiary amines such as triethylamine; hydroxides of alkali metals such as sodium hydroxide and potassium hydroxide; and hydroxide of alkali earth metals such as calcium hydroxide and magnesium hydroxide.

The inventors hereof have found that the presence of substances selected from the following generic formula preventing the mold from cracking at pouring and do not impair the shake out properties of the mold:

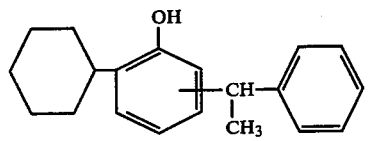

(mono-styrenated o-cyclohexylphenol)

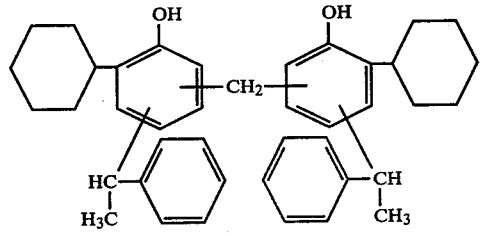

The most preferable incorporating proportion range of said mono-styrenated o-cyclohexylphenols is 0.5 to 40 parts by weight into 100 parts by weight of phenolic resins. When it is less than 0.5 parts by weight, it is insufficient to prevent the mold cracks. When it is more that 40 parts by weight, it impairs the initial strength of the molds.

The proper time for incorporating said mono-styrenated o-cyclohexylphenols during the process of preparing phenolic resin is optional: at the beginning, during or after reacting phenols with formaldehyde. Alternatively, after preparing said solid phenolic resin, said mono-styrenated o-cyclohexylphenols are incorporated thereinto by mix-grinding or melt-mixing with a kneading machine such as an extruder. It is also possible to incorporate the mono-styrenated o-cyclohexylphenols during the resin coated sand production steps; the proper time for incorporating the mono-styrenated substances thereinto is optional: prior to, during or after adding the phenolic resin thereinto. The mono-styrenated o-cyclohexylphenols are incorporated either as they are, or as dispersed in a medium. Any incorporating method reduces the abrupt thermal expansion of shell-molds obtained from resin coated sand.

Lubricant are usable according to the present invention, which are ordinary ones, however, preferable are ethylene bis-stearic amide, methylene bis-stearic amide, oxy-stearic amide, stearic amide, and methylol stearic amide. Lubricant-containing phenolic resins can be obtained by adding said lubricant to phenolic resins at any stage of their preparation; prior to, during or after the reaction.

Methods for producing resin coated sand in the present invention may be any of the commercial hot-coating, semi-hot-coating, cold-coating and powder-solvent coating, however, hot-coating is preferably recommended for the present invention.

The inventors hereof will explain the present invention by the following nonlimitative Examples and Comparative Examples, wherein "parts" and "percent" indicate "parts by weight" and "percent by weight", respectively.

PREPARATION EXAMPLES 1 AND 2

To a reaction kettle with a reflux cooler and a stirrer, 1000 parts of phenol, 650 parts of 37% formalin, and 10 parts of oxalic acid were charged. The temperature of the mixture was gradually elevated, and when it reached 96° C., it was refluxed for 120 minutes. 10 parts of methylene bis-stearic amide and 100 parts of the following mono-styrenated o-cyclohexylphenol (I) were added thereto. After the mixture was mixed well, it was dehydrated under vacuum and successively discharged from the kettle. Thus, a lubricant-containing novolac type phenolic resin was obtained as Preparation Example 1.

Except for changing mono-styrenated o-cyclohexylphenols from the following (I) to (II), the same operations were run, and a novolac type phenolic resin was obtained as Preparation Example 2.

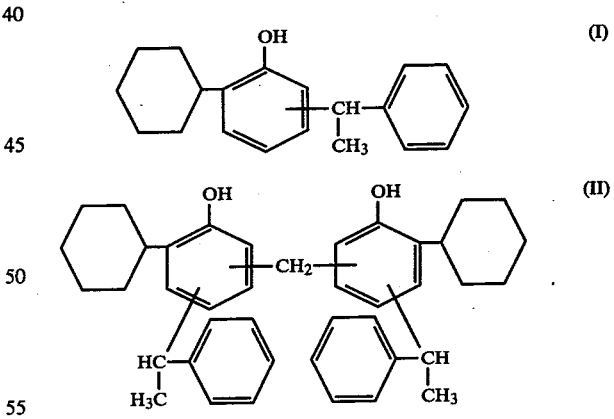

PREPARATION EXAMPLE 3

To a reaction kettle with a reflux cooler and a stirrer, 1000 parts of phenol, 1795 parts of 37% formalin, 160 parts of 28% aqueous ammonia, and 60 parts of 50% sodium hydroxide solution were charged. The temperature of the mixture was gradually elevated, and when it reached 90° C., it was refluxed for 30 minutes, 40 parts of ethylene bis-stearic amide and 165 parts of said mono-styrenated substance (II) were added. After the mixture was mixed well, it was dehydrated under vacuum, discharged from the kettle and chilled quickly. Thus, a lubricant-containing solid resole type phenolic resin was obtained.

PREPARATION EXAMPLE 4

To a reaction kettle with a reflux cooler and a stirrer, 1000 parts of phenol, 650 parts of 37% formalin, and 10 parts of oxalic acid were charged. The temperature of the mixture was gradually elevated, and when it reached 96° C., it was refluxed for 30 minutes. 10 parts of methylene bis-stearic amide were added thereto. After the mixture was mixed well, it was dehydrated under vacuum, and discharged from the kettle. Thus, 970 parts of a novolac type phenolic resin was obtained.

PREPARATION EXAMPLE 5

To a reaction kettle with a reflux cooler and a stirrer, 1000 parts of phenol, 1795 parts of 37% formalin, 160 parts of 28% aqueous ammonia, and 60 parts of 50% sodium hydroxide solution were charged. The temperature of the mixture was gradually elevated, and when it reached 96° C., it was refluxed for 30 minutes. 40 parts of methylene bis-stearic amide were added thereto. After the mixture was mixed well, it was dehydrated under vacuum discharged from the kettle, and chilled quickly. Thus, 1100 parts of a solid resole type phenolic resin was obtained.

EXAMPLE 1

Preheated at 130° to 140° C., 7000 parts of Sanei No. 6 silica sand were charged into a whirl-mixer. After 140 parts of novolac type phenolic resin obtained according to Preparation Example 1 were added thereto, they were mixed for 40 seconds, and 21 parts of hexamethylene tetramine dissolved in 105 parts of water were added thereto. The mixture was further mixed well until it crumbled. 7 parts of calcium stearate were added thereto, and after 30 seconds mixing, discharged and aerated. A resin coated sand was obtained.

EXAMPLE 2

Except for using novolac type phenolic resin obtained according to Preparation Example 2, resin coated sand was obtained by the same conditions as Example 1.

EXAMPLE 3

Preheated at 130° to 140° C., 7000 parts of Sanei No. 6 silica sand were charged into a whirl-mixer. After 140 parts of resole type phenolic resin obtained according to Preparation Example 3 were added thereto, they were mixed for 40 seconds, and 105 parts of cooling water were added thereto. The mixture was further mixed well until it crumbled. 7 parts of calcium stearate were added thereto, mixed for 30 seconds, discharged and aerated. A resin coated sand was obtained.

EXAMPLE 4

Preheated at 130° to 140° C., 7000 parts of Sanei No. 6 silica sand were charged into a whirl-mixer and successively 130 parts of novolac type phenolic resin obtained according to Preparation Example 4 were added thereto. Followed by 20 seconds mixing, 13 parts of said mono-styrenated substance (II) were added thereto. After mixing for 20 seconds, 21 parts of hexamethylene tetramine dissolved in 105 parts of water were added thereto. The mixture was further mixed until it crumbled. 7 parts of calcium stearate was added thereto, followed by 30 seconds mixing, the mixture was discharged and aerated. A resin coated sand was obtained.

EXAMPLE 5

Preheated at 130° to 140° C., 7000 parts of Sanei No. 6 silica sand were charged into whirl-mixer. After 13 parts of said mono-styrenated substance (I) were added thereto, they were mixed for 20 seconds. 78 parts of lubricant-containing novolac type phenolic resin according to Preparation Example 4 and 52 parts of lubricant-containing resole type phenolic resin according to Preparation Example 5 were added thereto, and mixed for 20 seconds. Then, 13 parts of calcium stearate were added thereto, mixed for 30 seconds, discharged and aerated. A resin coated sand was obtained.

COMPARATIVE EXAMPLE 1

Preheated at 130° to 140° C., 7000 parts of Sanei No. 6 silica sand were charged into a whirl-mixer. After 140 parts of novolac type phenolic resin obtained according to Preparation Example 4 were added thereto, they were mixed for 40 seconds, and 21 parts of hexamethylene tetramine dissolved in 105 parts of water were added thereto. The mixture was mixed until it crumbled. 7 parts of calcium stearate were added thereto, mixed for 30 seconds, discharged and aerated. A resin coated sand was obtained.

COMPARATIVE EXAMPLE 2

Preheated at 130° to 140° C., 7000 parts of Sanei No. 6 silica sand were charged into a whirl-mixer. After 140 parts of resole type phenolic resin obtained according to Preparation Example 5 were added, they were mixed for 40 seconds, and 105 parts of cooling water were added thereto. The mixture was mixed until it crumbled. 7 parts of calicium stearate were added thereto, mixed for 30 seconds, discharged and aerated. A resin coated sand was obtained.

Table 1 indicates the characteristics of various kinds of resin coated sand obtained according to Examples 1, 2, 3, 4, and 5, and Comparative Examples 1 and 2, as well as the abrupt thermal expansion rate and the shake-out property of shell-molds obtained therefrom.

TABLE I

| | | | Example | | | | | Comparative Example | |
|---|---|---|---|---|---|---|---|---|---|
| | | 1 | 2 | 3 | 4 | 5 | | 1 | 2 |
| No. of Preparation Examples (phenolic resin used) | | 1 | 2 | 3 | 4 | 4 + 5 | | 4 | 5 |
| Kind of substances used | | I | II | II | II | I | | — | — |
| Incorporating proportion of substances into 100 parts of phenolic resin | | 10 | 10 | 15 | 10 | 10 | | 0 | 0 |
| Resin coated sand | Stick point (°C.) | 95 | 97 | 90 | 98 | 92 | | 102 | 98 |
| | Bending strength (Kg/cm$^2$) | 31.5 | 31.7 | 29.1 | 31.5 | 29.5 | | 30.1 | 28.9 |
| Shell mold | Tensile strength 30 sec. | 2.0 | 2.2 | 1.5 | 2.1 | 1.9 | | 2.5 | 1.9 |

TABLE I-continued

|  |  | Example | | | | | Comparative Example | |
|---|---|---|---|---|---|---|---|---|
|  |  | 1 | 2 | 3 | 4 | 5 | 1 | 2 |
| under heat (Kg/cm²) at 250° C. | 45 sec. | 4.5 | 4.7 | 2.6 | 4.6 | 4.0 | 5.0 | 3.1 |
|  | 60 sec. | 7.8 | 7.9 | 5.8 | 8.0 | 7.0 | 8.2 | 6.6 |
| Abrupt thermal expansion rate (%) |  | 1.15 | 0.92 | 0.85 | 1.08 | 1.22 | 1.50 | 1.63 |
| Shake-out property (times) |  | 30 | 31 | 30 | 31 | 30 | 32 | 29 |

Procedures used for testing of samples in Table 1.
Bending strength:
  according to JACT Method SM-1
Stick point:
  according to JACT Method C-1
Tensile strength under elevated temperature:
  according to JACT Method SM-10
Abrupt thermal expansion rate:
  according to JACT Method SM-7 at 1000° C.
Shake-out property:
  Preparation of specimen:
    Coated sand is fed into an iron pipe of 29 mm in diameter and 150 mm length. After 30 minutes' baking, it is covered with aluminum foil and further heated for 3 hours at 370° C. After cooling, the sand molded pipe is removed.
  Test method:
    The specimen if flogged by the impact arm of the apparatus illustrated in FIG. 1. Crumbled sand is removed from the pipe after each flogging. Weighing the residual molded sand of the specimen until it becomes zero, and the shake-out property is defined by the number of floggings required.
  Test apparatus:
    In FIG. 1, A is a molded sand specimen and B is the arm which revolves around pivot C set at 30 cm high, said arm is at first set horizontally, and then allowed to drop so as to flog the specimen.

We claim:

1. Resin coated sand for shell molding foundry applications comprising foundry aggregates coated with a phenolic resin and mono-styrenated o-cyclohexylphenols selected from the following generic formulae:

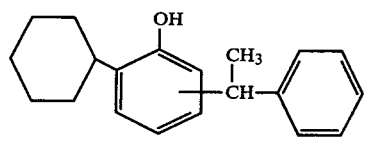

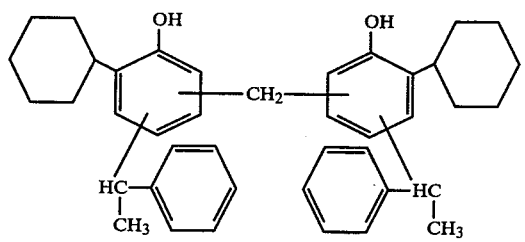

wherein the mono-styrenated o-cyclohexylphenols are incorporated at a ratio of about 0.5 to about 40 parts by weight to 100 parts by weight phenolic resin.

2. Resin coated sand for shell molding foundry applications according to claim 1, wherein the phenolic resin is a novolac phenolic resin.

3. Resin coated sand for shell molding foundry applications according to claim 1, wherein the phenolic resin is a resole phenolic resin.

4. Resin coated sand for shell molding foundry applications according to claim 1, wherein the phenolic resin is a mixture of novolac and resole phenolic resins.

5. Resin coated sand for shell molding foundry applications according to claim 1, wherein a lubricant is additionally added to the phenolic resin.

6. Resin coated sand for shell molding foundry applications according to claim 2, wherein a lubricant is additionally added to the phenolic resin.

7. Resin coated sand for shell molding foundry applications according to claim 3, wherein a lubricant is additionally added to the phenolic resin.

8. Resin coated sand for shell molding foundry applications according to claim 4, wherein a lubricant is additionally added to the phenolic resin.

9. Resin coated sand for shell molding foundry applications comprising foundry aggregates coated with a phenolic resin containing a lubricant and a mono-styrenated o-cyclohexylphenol selected from the following generic formulae:

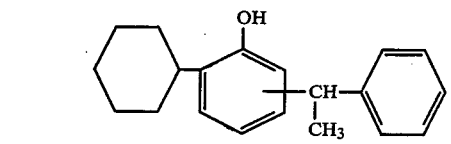

wherein said mono-styrenated o-cyclohexylphenols is present relative to the phenolic resin in the ratio of 0.5 to 40 parts per 100 parts phenolic resin.

10. Resin coated sand for shell molding foundry applications according to claim 9, wherein the phenolic resin is a novolac phenolic resin.

11. A resin coated sand for shell molding foundry applications according to claim 9, wherein the phenolic resin is a resole phenolic resin.

12. Resin coated sand for shell molding foundry applications according to claim 9, wherein the phenolic resin is a mixture of novolac and resole phenolic resin.

* * * * *